(12) United States Patent  (10) Patent No.: US 9,377,282 B2
Dockrey et al.  (45) Date of Patent: Jun. 28, 2016

(54) METHOD FOR VALIDATING A WORKPIECE MEASUREMENT IN A DIMENSIONAL METROLOGY HAND TOOL

(71) Applicant: Mitutoyo Corporation, Kawasaki-shi, Kanagawa-ken (JP)

(72) Inventors: Matthew Raymond Dockrey, Seattle, WA (US); Casey Edward Emtman, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 416 days.

(21) Appl. No.: 14/017,206

(22) Filed: Sep. 3, 2013

(65) Prior Publication Data

US 2015/0059480 A1 Mar. 5, 2015

(51) Int. Cl.
*G01B 3/18* (2006.01)
*G01B 21/04* (2006.01)
*G01B 3/20* (2006.01)

(52) U.S. Cl.
CPC *G01B 3/18* (2013.01); *G01B 3/205* (2013.01); *G01B 21/04* (2013.01)

(58) Field of Classification Search
CPC ........... G01B 21/04; G01B 3/18; G01B 3/205
USPC .......................................................... 73/649
See application file for complete search history.

(56) References Cited

U.S. PATENT DOCUMENTS

| | | |
|---|---|---|
| 1,132,704 A | 3/1915 | Coes |
| 3,849,890 A | 11/1974 | Jeannet |
| 4,485,556 A | 12/1984 | Sakata |
| 4,561,185 A | 12/1985 | Sakata |
| 4,631,683 A * | 12/1986 | Thomas ............. G05B 19/4065 318/563 |
| 4,827,771 A * | 5/1989 | Cary ......................... B06B 3/00 73/644 |
| 5,026,164 A | 6/1991 | Ichikawa |
| 5,260,521 A | 11/1993 | Knowles |
| 5,491,305 A | 2/1996 | Kawakami |
| 5,495,677 A | 3/1996 | Tachikake |
| 5,574,381 A | 11/1996 | Andermo |
| 5,901,458 A | 5/1999 | Andermo |
| 5,973,494 A | 10/1999 | Masreliez |
| 6,286,227 B1 | 9/2001 | Corby, Jr. |
| RE37,490 E | 1/2002 | Andermo |
| 6,400,138 B1 | 6/2002 | Andermo |
| 7,856,731 B2 | 12/2010 | Weston |
| 7,982,724 B2 | 7/2011 | Hill |
| 8,091,251 B1 | 1/2012 | Zhang |
| 8,448,515 B2 * | 5/2013 | Orleskie .................. G01F 1/34 73/579 |
| 8,739,428 B2 * | 6/2014 | Emtman .................. G01B 3/18 33/815 |
| 8,991,254 B2 * | 3/2015 | Raguenet .................. B25B 5/06 73/587 |
| 8,997,369 B2 * | 4/2015 | Jones ....................... G01B 3/18 33/813 |
| 2002/0005062 A1 | 1/2002 | Matsuki |
| 2005/0248548 A1 | 11/2005 | Tsumura |

* cited by examiner

*Primary Examiner* — J M Saint Surin
(74) *Attorney, Agent, or Firm* — Christensen O'Connor Johnson Kindness PLLC

(57) ABSTRACT

A method for validating a workpiece measurement in a handheld spatial dimension measurement metrology tool comprises vibrating a portion of the metrology hand tool using the vibration excitation element; sensing a vibration signature using the vibration sensor configuration; identifying a valid contact state between the metrology hand tool and the workpiece based on a vibration signature criterion; identifying a valid seating state based on a measurement stability criterion applied to a set of dimensional measurements of the metrology hand tool; and indicating that a dimensional measurement is valid for a dimensional measurement that is obtained when the valid contact state and the valid seating state occur simultaneously.

20 Claims, 8 Drawing Sheets

METHOD FOR VALIDATING A WORKPIECE MEASUREMENT IN A DIMENSIONAL METROLOGY HAND TOOL

FIELD

The present disclosure relates generally to contact-type dimensional metrology hand tools such as micrometers and calipers.

BACKGROUND

Various devices are known in the art for performing high-precision measurements of workpieces using a handheld mechanism. For example, U.S. Pat. Nos. 1,132,704; 3,849,890; 4,485,556; 4,561,185; and 8,091,251 (referred to herein as the '704, '890, '556, '185, and '251 patents), each of which is hereby incorporated by reference in its entirety, disclose micrometer devices. In particular, modern micrometers such as that disclosed in U.S. Pat. No. 5,495,677 (the '677 patent), which is hereby incorporated by reference in its entirety, comprise a linear digital sensor for determining measurements, rather than relying on accurate micrometer threads in combination with a rotary position-sensing device. Using a linear digital sensor eliminates the need to use accurate or fine pitch threads in order to drive the micrometer.

Various electronic calipers are known that use electronic position encoders. These encoders are generally based on low-power inductive, capacitive, or magnetic position-sensing technology. In general, an encoder may comprise a readhead and a scale. The readhead may generally comprise a readhead sensor and readhead electronics. The readhead outputs signals that vary as a function of the position of the readhead sensor relative to the scale, along a measuring axis. In an electronic caliper, the scale is generally affixed to an elongated scale member that includes a first measuring jaw and the readhead is affixed to a slider that is movable along the scale member and that includes a second measuring jaw. Thus, measurements of the distance between the two measuring jaws may be determined based on the signals from the readhead. Exemplary electronic calipers are disclosed in commonly assigned U.S. Pat. Nos. RE37490; 5,574,381; and 5,973,494, each of which is hereby incorporated by reference in its entirety.

In the process of taking dimensional measurements using hand tools such as micrometers or calipers, it is necessary for a workpiece to be properly seated against two contact surfaces in order to provide a precise dimensional measurement. It has been conventional to rely solely upon the user to judge and/or determine that this condition is fulfilled. However, in many industrial inspection operations it would be desirable to determine that this condition is fulfilled by operations independent of and/or in addition to the user determination, especially for less skilled users.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
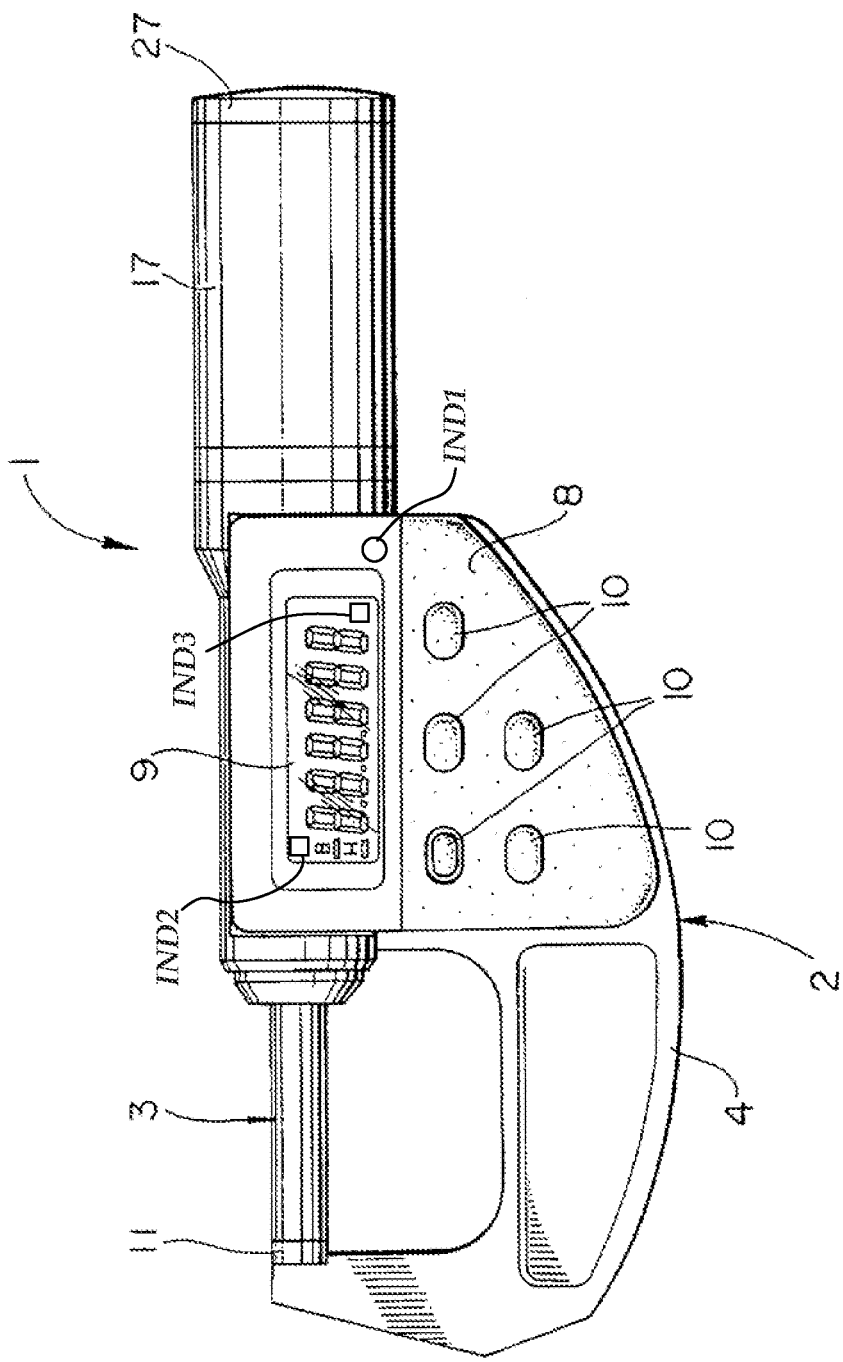
FIG. 1 is a diagram of a basic micrometer gauge that may be adapted to the principles disclosed herein.

FIG. 1 is a diagram of a basic micrometer that may be adapted to the principles disclosed herein. The micrometer of FIG. 1 may incorporate elements of the commonly assigned '677 patent, as well as other known micrometer features, and may additionally be adapted to comprise elements and operations described in FIGS. 2 through 8.

In FIG. 1, a digital display micrometer gauge 1 has a main body 2 formed as a closed, waterproof/dustproof structure. A spindle 3 is adapted to project from and retract into the main body 2. A cover member 8, seen in FIG. 1, is provided on the front surface of a U-shaped main frame 4. A digital display device 9 and a plurality of operating switches 10 are provided on the front surface of cover member 8.

The U-shaped main frame 4 has two outwardly extending ends defining an opening with an anvil 11 disposed at one of the ends as seen in FIG. 1. At the other end of the main frame 4, the spindle 3 is supported such that it can be axially displaced by turning a thimble 17. One end of the spindle 3 is adapted to abut against the anvil 11. An end cap 27 may cover the end of the thimble 17 and/or its contents.

FIG. 1 also shows three possible measurement validity indicators IND1, IND2, and IND3. Measurement validity indicators IND1, IND2, and IND3 indicate when a workpiece is properly seated between the spindle 3 and the anvil 11 for a spatial dimension measurement, according to sensing and signal-processing principles described further below. Measurement validity indicator IND1 may be a light (e.g., an LED) that may be activated or change color when a workpiece is properly contacted and seated. Measurement validity indicators IND2 and IND3 may be portions of the digital display device 9 (e.g., a portion of an LCD) that may be activated when a workpiece is properly seated.

It should be appreciated that the indicators IND1, IND2, and IND3 are optional alternatives to one another such that one or more of the indicators may be omitted in various embodiments. Furthermore, these indicators are exemplary only and not limiting. Other indicators may comprise turning on a previously blank display (e.g., a measurement display), holding steady a previously blinking display (e.g., a measurement display), sounding an audio signal, and/or automatically outputting a measurement signal to an external device. Various other locations and/or types of indicators may be used according to arrangements that will be apparent to one skilled in the art, based on the principles disclosed herein.

Figure 2:
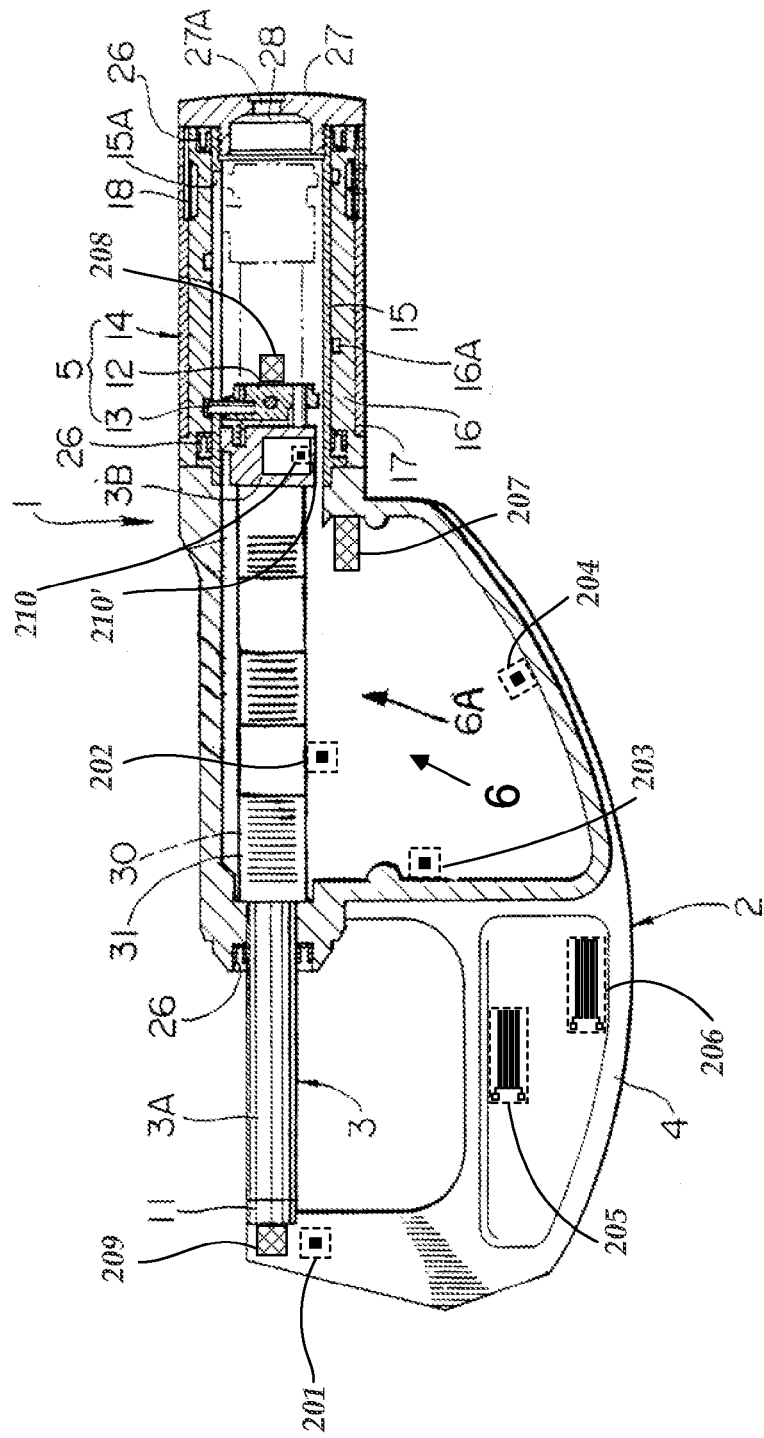
FIG. 2 is a cut-away diagram of the micrometer gauge shown in FIG. 1, showing further details.

FIG. 2 is a cut-away diagram of the micrometer gauge 1 shown in FIG. 1, showing further details including one embodiment of a vibration sensor configuration usable according to the principles disclosed further below. As seen in FIG. 2, the main body 2 includes a U-shaped main frame 4, a spindle driving mechanism 5 (spindle drive for short) for causing the spindle 3 to advance and retreat, and a dimensional measurement sensor comprising a position transducer 6 for detecting the displacement amount and/or position of spindle 3. The position transducer 6 is a linear encoder, arranged inside the U-shaped main frame 4 through the intermediation of a gap control mechanism 7 (not shown) and a main scale 31. The main scale 31 is arranged on the spindle body 3A through the intermediation of a scale-mounting member 30.

The position transducer 6 is connected to the digital display device 9, shown in FIG. 1, through a signal processor comprising known electronic devices, such as a counter and CPU (not shown). The position transducer 6 employs a photoelectric-type encoder 6A as schematically seen in FIG. 2. For example, the photoelectric type encoder disclosed in U.S. Pat. No. 5,026,164 could be employed, this disclosure being incorporated herein by reference. The position transducer 6 may also employ a capacitive- or inductive-type encoder in alternative embodiments.

In the embodiment shown in FIG. 2, the spindle driving mechanism 5 comprises a stopper 12 attached to the other end of the slide member 3B of the spindle 3, a pin-like engagement member 13 attached to the stopper 12, and an engagement member driving mechanism 14 for causing the engagement member 13 to advance and retreat along the axial direction of the spindle 3. The engagement member driving mechanism 14 comprises an inner sleeve 15 and an outer sleeve 16. One end of the inner sleeve 15 is secured to the U-shaped frame 4 and has a slit 15A into which the engagement member 13 is inserted extending along the axial direction of the spindle 3. The outer sleeve 16 fits onto the outer periphery of the inner sleeve 15 to be circumferentially rotatable and has in the inner peripheral section thereof a spiral groove 16A that engages with the engagement member 13. The spiral groove 16A is one embodiment of a spindle drive thread as outlined in greater detail below.

The thimble 17 rotatably fits onto the outer peripheral surface of the outer sleeve 16. Two flexures or leaf or plate springs 18 are arranged between the thimble 17 and the outer sleeve 16. When the thimble 17 is rotated in one direction, the torque of this rotation is transmitted to the spindle 3 through the plate springs 18, the spiral groove 16A of the outer sleeve 16, and the engagement member 13. Thereby, the spindle 3 advances toward the anvil 11. Rotating the thimble 17 in the other direction causes the spindle 3 to retreat.

The slide member 3B of the spindle 3 is slidably supported in the inner sleeve 15 and contacts the inner sleeve 15 about the periphery of the spindle 3. When the spindle 3 moves away from the anvil 11, the spindle body 3A, on which the main scale 31 is provided, is inserted into the inner sleeve 15, as indicated by the imaginary line of FIG. 2.

As shown in FIG. 2, ring-like seal members 26 are respectively provided between the spindle 3 and the U-shaped frame 4 and between the inner sleeve 15 and the outer sleeve 16. A threaded end cap 27 is engaged with the open end portion of the inner sleeve 15. The end cap 27 has an opening 27A through which the interior of the gauge body 2 communicates with the exterior atmosphere.

A porous member 28 closes the opening 27A and is attached to the inner side of the end cap 27, whereby, it is possible to prevent changes in the pneumatic pressure of the closed space inside the U-shaped frame 4 when the spindle 3 moves in and out.

FIG. 2 shows a vibration sensor configuration comprising several possible independent or cooperating locations for a vibration sensor. In exemplary embodiments, a vibration sensor may be one of an accelerometer or a strain gauge arranged to provide a vibration signal derived from a strain in the structure it is attached to. In the embodiment(s) shown in FIG. 2, an accelerometer 201 is located near the anvil 11, an accelerometer 202 is located against the scale mounting member 30, an accelerometer 203 is located against the main body 4, an accelerometer 204 is located against the main body 4, and a strain gauge 205 is located against a first bending portion of the main body 4, a strain gauge 206 is located against a second bending portion of the main body 4, and an accelerometer 210 is located against a slightly compliant portion 210' of the slide member 3B. In various embodiments, all or some of these vibration sensors may be present and used to provide a vibration signature, as described in greater detail below.

FIG. 2 also shows several possible locations for a vibration excitation element. A vibration excitation element 207 is located against the main body 4 near the thimble 17. A vibration excitation element 208 is located against the stopper 12. A vibration excitation element 209 is located near the anvil 11.

In various embodiments, a contact-type dimensional metrology hand tool, such as a micrometer gauge that is configured according to the principles disclosed herein, may comprise a dimensional measurement sensor, a vibration excitation element, a vibration sensor configuration, and a signal processor on. A method for validating a workpiece measurement in the contact-type dimensional metrology hand tool comprises vibrating a portion of the metrology hand tool using the vibration excitation element; sensing a vibration signature using the vibration sensor configuration; identifying a valid contact state between the metrology hand tool and the workpiece based on a vibration signature criterion; identifying a valid seating state based on a measurement stability criterion applied to a set of dimensional measurements of the metrology hand tool (as described in greater detail below); and indicating that a dimensional measurement is valid for a dimensional measurement that is obtained when the valid contact state and the valid seating state occur simultaneously. In the embodiment shown in FIG. 2, the micrometer gauge 1 may be vibrated with one of the exemplary vibration excitation elements 207, 208, and/or 209. A vibration signature (described in greater detail below) may be obtained at an appropriate time in relation to the operation of the vibration excitation element (e.g., during excitation, or shortly after). The vibration signature is based on signals from one or more of the exemplary accelerometers 202, 203, and 204 and/or one or more of the exemplary strain gauges 205 and 206. The occurrence or presence of a valid contact state may be determined based on analyzing the obtained vibration signature in relation to a vibration signature criterion that is known (e.g., by experiment) to indicate contact between the workpiece and the measurement-determining surfaces of the metrology hand tool. In one embodiment, obtaining and analyzing the vibration signature may be performed according to circuits and/or routines included in the signal processor of the metrology hand tool. In some embodiments, control and/or data signals may be exchanged between the metrology hand tool and a host system, and at least a portion of the operations related to obtaining and analyzing the vibration signature may be performed by the host system.

In some embodiments, the valid contact vibration signature criterion may be defined such that it identifies a change in the dominant frequency or frequencies in the vibration signature that is caused by contact. As a first example, the vibration excitation element may primarily drive a vibration near a first one of the contact surfaces, and a vibration sensor may sense vibration near the second contact surface. Thus, in the absence of a workpiece, excitation of the vibration sensor may be weak or absent at the excited vibration frequency. In the presence of workpiece contact that spans between the first and second contact surfaces, the excited vibration frequency may be transmitted through the workpiece to the second contact surface and the nearby vibration sensor (e.g., the vibration excitation element 208 may excite a vibration of the spindle 3, which is transmitted through the workpiece and sensed by the vibration sensor 201). Thus, that vibration sensor may output that transmitted vibration frequency as a dominant frequency that is only significant during a valid contact.

As a second example, an inherent or specially fabricated structure of the hand tool may be stretched or compressed by the contact forces, changing its natural frequency. Thus, a vibration sensor positioned on that portion may output a dominant natural frequency that is higher (or lower) only during a valid contact. In one embodiment shown in FIG. 2, a workpiece contact force on the spindle 3 may be transmitted to compress a slightly compliant portion 210' of the slide member 3B. The vibration sensor 210 senses the vibration of that portion that may be designed to have a lower frequency when compressed. In a third example, an additional and/or alternative frequency-increasing effect may occur when contact with a workpiece is sufficient to form a "combined structure" that is stiffer than the isolated hand tool, providing a frequency higher than that exhibited by the isolated hand tool.

In some embodiments, the valid contact vibration signature criterion may be defined such that it identifies a change in the amplitude of a frequency or frequencies in the vibration signature that is caused by contact. As a first example, the vibration excitation element may drive vibration near a first one of the contact surfaces and/or on a corresponding first member, and a vibration sensor may sense vibration near the second contact surface and/or on a corresponding second member. The sensed vibration may include a dominant frequency that is a resonant frequency of an inherent or specially fabricated structure of the hand tool. In the absence of a workpiece, excitation of the vibration sensor may be weak at that resonant frequency. However, in the presence of workpiece contact that spans between the first and second contact surfaces, the vibration excitation (e.g., a broadband vibration, "tap," or pulse) may be transmitted through the workpiece to the second contact surface and drive the vibration at the resonant frequency sensed by the vibration sensor with a higher amplitude during "valid contact" than in the non-contact case.

In some embodiments, a contact-type dimensional metrology hand tool may comprise two contact surfaces and the vibration signature criterion may correspond to a workpiece causing increased damping of a vibration at at least one contact surface during valid contact. This may be observed, for example, as a decreased vibration amplitude or attenuated response to a driving frequency during a valid contact (e.g., in the case of a sufficiently sustained vibration) and/or a more rapid decay of a vibration amplitude resulting from a response to an impulse provided by the vibration excitation element, or the like. As shown in FIG. 2, the micrometer gauge includes two contact surfaces for measuring a dimension, i.e., the spindle body 3A and the anvil 11. In some embodiments such as the embodiment illustrated in FIG. 3, the vibration signature criterion may correspond to a workpiece damping both contact surfaces. In some such embodiments, a vibration excitation element may be located close enough to a vibration sensor to ensure its excitation in the absence of a workpiece, to provide a signal that initially has a high amplitude such that damping and/or decay rate variations are more easily determined. In some embodiments, such an arrangement may be provided corresponding to each of the two contact surfaces. However, in other embodiments, one of the vibrations sensors may be excited through the workpiece, as outlined previously.

In some embodiments, a vibration excitation element may be one of: an automatically or manually activated piezoelectric element, a vibration motor, and/or a ratchet/clutch element, or other suitable element. For example, the exemplary vibration excitation elements 207 and 208 may be one of a piezoelectric element and a vibration motor. In another exemplary embodiment, either a standard or specialized ratchet/clutch element that drives a spindle body toward an anvil with a controlled torque (which is an inherent part of some micrometers) may provide an impulse vibration that may be used to vibrate a micrometer in order to validate a workpiece measurement. In various embodiments, the vibration excitation element may be battery powered, or powered through a mechanism deriving power from a manual operation that is an inherent part of operating the metrology hand tool.

In various embodiments, a valid contact criterion may be used to insure a valid contact between a workpiece and the two measurement surfaces of a contact-type metrology hand tool, as outlined above and described in further detail below. However, generally speaking, this is a necessary condition for a valid measurement, but it is not a sufficient condition. In addition, a measurement stability criterion may also need to be fulfilled, for reasons described below with reference to FIGS. 3 and 4. A measurement stability criterion is described in greater detail below, with reference to FIGS. 7A and 7B.

Figure 3:
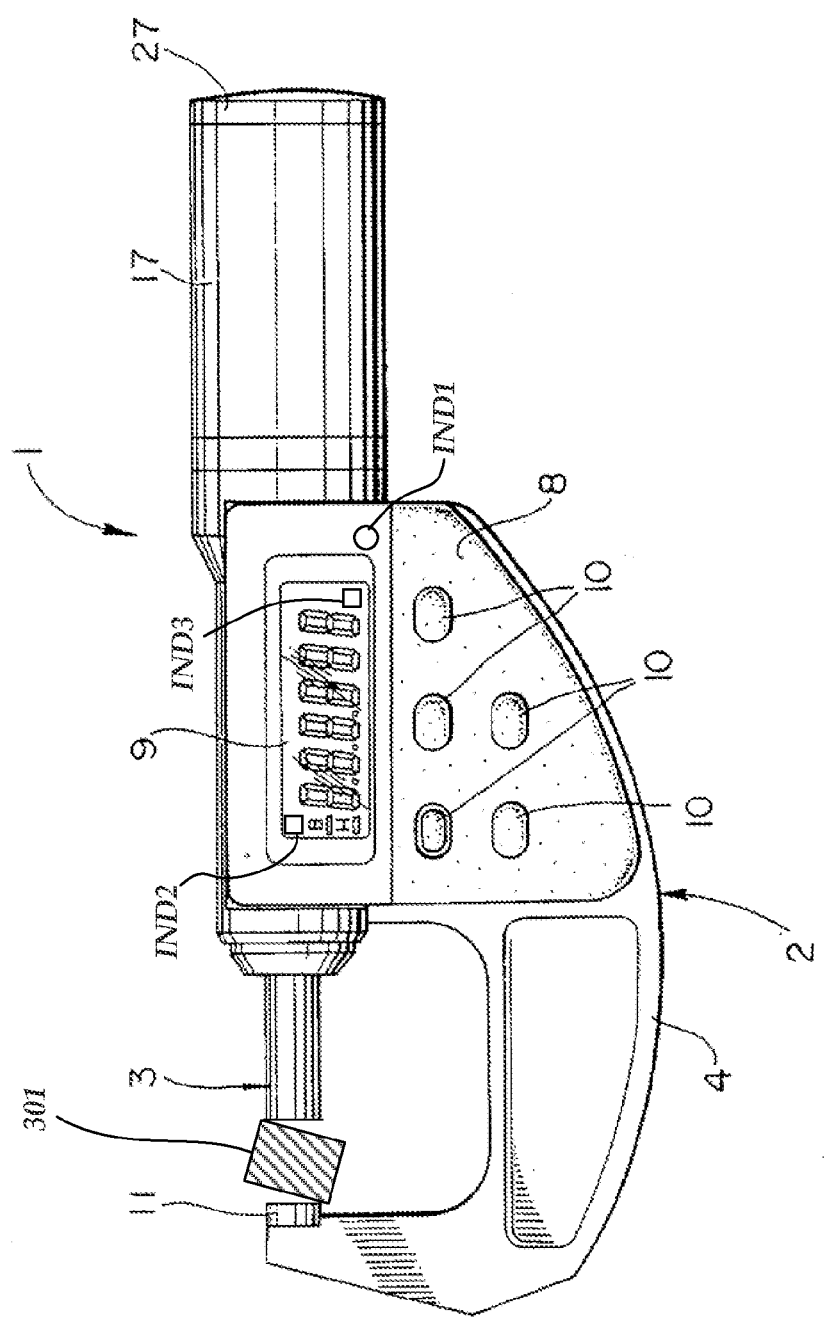
FIG. 3 is a diagram of the micrometer gauge of FIGS. 1 and 2 and an improperly seated workpiece.

FIG. 3 is a diagram of the micrometer gauge 1 of FIGS. 1 and 2 and a workpiece 301. As shown in FIG. 3, the workpiece 301 is in contact with the spindle 3 and the anvil 11. It will be appreciated that in this configuration the contact between the workpiece 301 and the spindle 3 and anvil 11 may provide any of the various contact effects that cause a vibration signature to fulfill the valid contact criterion (e.g., a frequency and/or amplitude and/or damping change) outlined above in the description of FIG. 2. This is especially true if a user exerts a significant torque between the workpiece 301 and the micrometer gauge 1, which is a common occurrence, particularly for relatively unskilled users. However, although the contact with the workpiece 301 may fulfill the valid contact criterion, it is apparent that the workpiece 301 is not properly seated for an accurate dimensional measurement.

Figure 4:
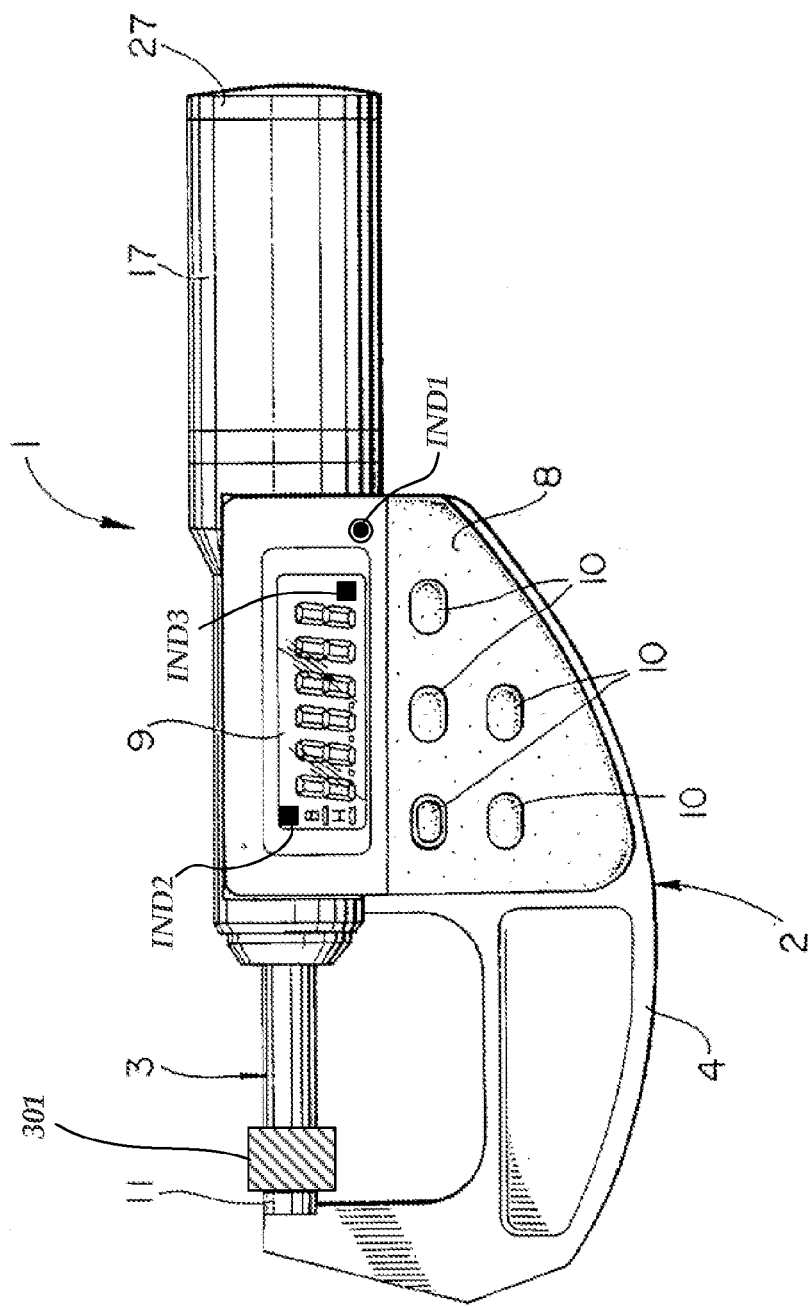
FIG. 4 is a diagram of the micrometer gauge of FIGS. 1, 2, and 3, and a properly seated workpiece.

FIG. 4 is a diagram of the micrometer gauge 1 of FIGS. 1, 2, and 3, and a workpiece 301. As shown in FIG. 4, the workpiece 301 not only is in a valid contact state, it is also properly seated for an accurate dimensional measurement, which is referred to as a valid seating state herein. Both the spindle 3 and the anvil 11 are now flush with surfaces of the workpiece 301. In general, for the illustrated configuration of the workpiece 301 and the micrometer 1 shown in FIGS. 3 and 4, measurements during a valid contact state (that is, a state where a vibration signature fulfills the valid contact criterion) will be at approximately a minimum value when the workpiece 301 is properly seated as shown in FIG. 4. In various embodiments, identifying a valid seating state may be based on a measurement stability criterion applied to a set of dimensional measurements of the metrology hand tool, as described in greater detail below with reference to FIGS. 7A and 7B. A valid seating state occurring simultaneously with a valid contact state is a necessary and sufficient condition to indicate that a dimensional measurement is valid and accurate. As shown in FIG. 4, when these states occur simultaneously, a visible measurement validity indicator (e.g., one of the measurement validity indicators IND1, IND2, and IND3) may be activated to indicate to a user and/or host system that a valid measurement has been established.

FIGS. 5A-5D are graphs schematically representing vibration signatures corresponding to different states of contact between a workpiece and a contact-type metrology hand tool (e.g., as outlined above with reference to FIGS. 1-4). In one embodiment, a wide bandwidth accelerometer-type vibration sensor may provide signal(s) corresponding to such vibration signatures. In another embodiment, filter circuits may be used to provide a frequency-sampled vibration signature comprising signals sampled at one or more discrete frequencies or narrow frequency ranges (e.g., corresponding to useful vibration modes that are sufficient to distinguish between contact and non-contact states). In another embodiment, vibration sensors may be affixed to mechanical frequency filters or resonant structures which are operate at frequencies that may be used to distinguish between contact and non-contact states. It will be appreciated that in some such embodiments, there may be a one-to-one correspondence between a particular vibration sensor and a particular vibration frequency that the sensor samples or responds to. Therefore, a vibration signature may be characterized in some embodiments in terms of "sensor response" rather than in terms of a frequency response, or amplitude respond, or the like. For example, a tuned vibration sensor may be monitored by a circuit and/or routine that includes a built-in signal threshold, such that it simply outputs a binary signal corresponding to a no-contact or valid contact state depending on the signal level. Such an output is to be regarded as one type of vibration signature according to the principles disclosed herein.

In various embodiments, vibration sensor signal(s) may be sampled and held at a time that is based on a trigger derived from an initiation of the vibration excitation element pulse, or derived from a vibration sensor signal initially crossing a trigger threshold value, or the like. In one embodiment the signals may be rectified and/or low-pass filtered, or the like, according to known methods. Various appropriate known signal measurement circuits will be apparent to one of ordinary skill in the art based on the principles disclosed herein.

Figure 5A:
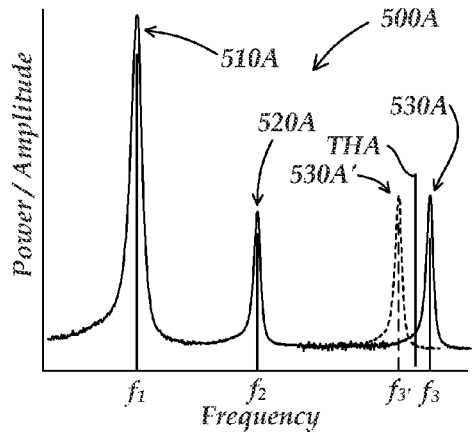
FIGS. 5A-5D are graphs schematically representing vibration signatures corresponding to different states of contact between a workpiece and a contact-type metrology hand tool.
Figure 5B:
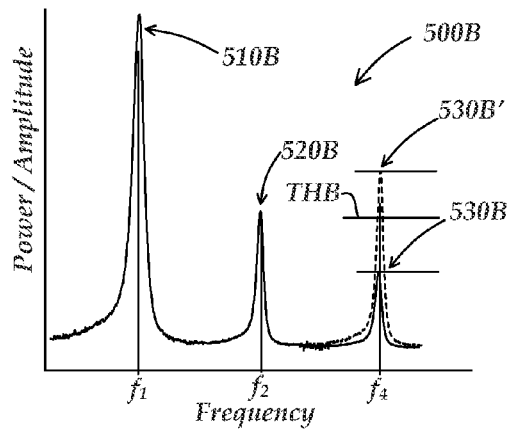
Figure 5C:
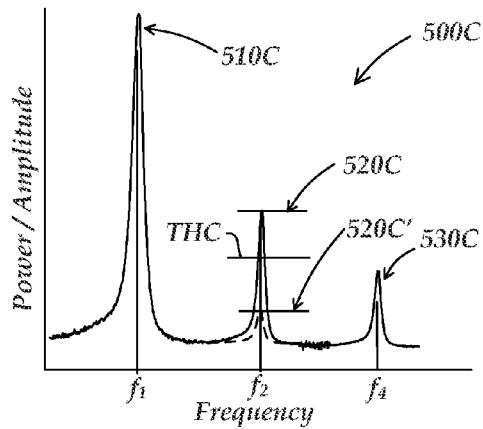

FIG. 5A is a graph 500A of schematically represented vibration signature comprising certain vibration mode frequencies of an exemplary micrometer. The solid line shows a non-contact vibration signature (when a workpiece is not contacting the measuring contact surfaces of the micrometer). The dashed line shows a change associated with a contact vibration signature (when a workpiece is contacting one or both measuring surfaces of the micrometer). The non-contact vibration signature shows a first frequency peak 510A at a frequency $f_1$, a second frequency peak 520A at a frequency $f_2$ and a third frequency peak 530A at a frequency $f_3$. It should be appreciated that more frequency peaks may occur in a complete vibration signature, but for simplicity only the three peaks are shown in FIGS. 5A-5C. The first frequency peak 501A is an example of a low frequency vibration which is typical of that excited by a user's motions moving or carrying a dimensional metrology hand tool. Generally, such vibrations are below 10 Hz. The second frequency peak 520A is an example of a higher frequency mode (e.g., between 50 and 1,000 Hz). For example, the second frequency peak 520A may be a lateral vibration mode of the spindle 3, (e.g., a bending mode of the spindle.) The third frequency peak 530A is an example of an even higher frequency mode (e.g., more than 1,000 Hz). For example, the third frequency peak 530A may be a vibration mode of a compliant portion 210' of the slide member 3B (outlined previously with reference to FIG. 2, and described in greater detail below) during a non-contacting state.

As outlined previously, in some embodiments, the valid contact vibration signature criterion may be defined such that it identifies a change in a dominant frequency or frequencies in the vibration signature that is caused by contact. In the example shown in FIG. 5A, a contact force between the workpiece and the spindle slightly compresses the compliant portion 210' (shown in FIG. 2) lowering its resonant frequency from $f_3$ to $f_{3'}$. A vibration sensor (e.g., the vibration sensor 210) may output a vibration signature signal corresponding to the vibration of the compliant portion 210'. A threshold frequency THA may be established (e.g., by experiment and/or analysis) between the frequency peak 530A and the frequency peak 530A' to discriminate between a non-contact state and a valid contact state. Thus, in some embodiments, the valid contact vibration signature criterion may comprise the presence of a detected frequency in the vibration signature that is not present in the non-contact signature (e.g., is not one of the frequencies $f_1$ and $f_2$) and that is lower than the threshold frequency THA.

In a dimensional metrology hand tool, a first contact surface is located on a first member (e.g., an assembly) and a second contact surface is located on a second member, wherein the first member moves relative to the second member. Thus, the workpiece will be located between contacts on the first and second member during measurement, and may be the primary path for transmitting vibration between the first and second member. In some embodiments of the type wherein the valid contact vibration signature criterion comprises detecting the presence of a frequency that is caused or changed by a valid contact state, the vibration excitation element may be located on the same member as a vibration sensor that senses the vibration signature. For example, referring to FIG. 2, the vibration sensor 210 may be used in combination with the vibration excitation element 208. In other embodiments of the type wherein the valid contact vibration signature criterion comprises detecting the presence of a frequency that is caused or changed during a valid contact state, the vibration excitation element may be located on a first member and the vibration sensor that senses the vibration signature may be located on a second member (e.g., referring to FIG. 2, the vibration sensor 210 may be used in combination with the vibration excitation element 209, or the vibration sensor 201 may be used in combination with the vibration excitation element 208, and so on). The latter embodiments may have an advantage over the former in that, due to the transmission of significant vibration energy primarily through the workpiece in the latter, it may be easier and/or more reliable to establish a valid contact vibration signature criterion which ensures that both contact surfaces are in contact with the workpiece. In one embodiment, the presence of a frequency lower than the threshold frequency THA may be detected by using a bandpass filter encompassing the frequencies $f_3$ to $f_{3'}$ on the output of the appropriate vibration sensor, and measuring the period or frequency of the filtered sensed vibration according to known methods using a clock circuit, and comparing the period or frequency to the frequency (or period) threshold THA. In one embodiment, the presence may be detected by using a narrower bandpass filter (e.g., having a cutoff below the frequency (or period) threshold THA but encompassing the frequency $f_{3'}$) on the output of the appropriate vibration sensor, and detecting whether the amplitude of the signal from that bandpass filter indicates a significant vibration signal. However, such embodiments are illustrative only, and not limiting. Alternative known detection circuits and/or routines may be used according to the principles disclosed herein.

It should be appreciated that although the foregoing example concerns embodiments wherein a valid contact state causes and/or shifts a frequency to occur at a lower frequency in a vibration signature, it will be apparent to one of ordinary skill in the art that analogous principles may be applied to embodiments wherein a valid contact state causes and/or shifts a frequency to occur at a higher frequency in a vibration signature.

FIG. 5B is a graph 500B of schematically represented vibration signature comprising certain vibration mode frequencies of an exemplary micrometer. Similarly to FIG. 5A, the solid line shows a non-contact vibration signature and the dashed line shows a change associated with a contact vibration signature. The non-contact vibration signature shows first and second frequency peaks 510B and 520B that may be analogous to the peaks 510A and 520A shown in FIG. 5A. A third frequency peak 530B (530B'W) is an example of a higher frequency mode (e.g., more than 1,000 Hz). For example, the third frequency peak 530B (530B') may be a longitudinal (axial) vibration mode of the spindle 3 (outlined previously with reference to FIG. 2).

As outlined previously, in some embodiments, the vibration excitation element may drive excitation and/or vibration near a first one of the contact surfaces and/or on a first member, and a vibration sensor may sense vibration near the second contact surface and/or on a second member. In the absence of a workpiece, excitation of the vibration sensor on the second member may be weak because it is not significantly coupled to the drive excitation and/or vibration on the first member. However, in the presence of workpiece contact that spans between the first and second contact surfaces, the vibration excitation (e.g., a broadband vibration, "tap," or pulse) may be transmitted through the workpiece to the second contact surface and drive the vibration sensed by the vibration sensor with a higher amplitude during "valid contact" than in the non-contact case.

In the example shown in FIG. 5B, the third frequency peak amplitude 530B during the non-contact state is relatively low because, in the absence of workpiece contact, the vibration sensor (e.g., the vibration sensor 201) is not significantly coupled to the output of the vibration excitation element (e.g., the vibration excitation element 208 or 207). The third frequency peak amplitude 530B' during a valid contact state (shown in dashed outline) is relatively high because, in the presence of valid workpiece contact, the vibration sensor (e.g., the vibration sensor 201) is significantly coupled to the output of the vibration excitation element (e.g., the vibration excitation element 208 or 207). A signal amplitude threshold THB may be established (e.g., by experiment and/or analysis) between the amplitudes 530B and 530B' to discriminate between a non-contact state and a valid contact state. Thus, in some embodiments, the valid contact vibration signature criterion may comprise the presence of a detected signal amplitude in the vibration signature that is higher than the signal amplitude present in the non-contact signature and/or higher than the amplitude threshold THB.

In some embodiments, the presence of a signal amplitude higher than the amplitude threshold THB may be detected by using a bandpass filter encompassing the frequencies $f_4$ on the output of the appropriate vibration sensor, and determining the peak signal amplitude or the average rectified signal, or the like, and comparing it to an appropriate amplitude threshold THB using known circuits and/or routines. However, such embodiments are illustrative only, and not limiting. Alternative known amplitude detection circuits and/or routines may be used according to the principles disclosed herein.

Figure 5D:
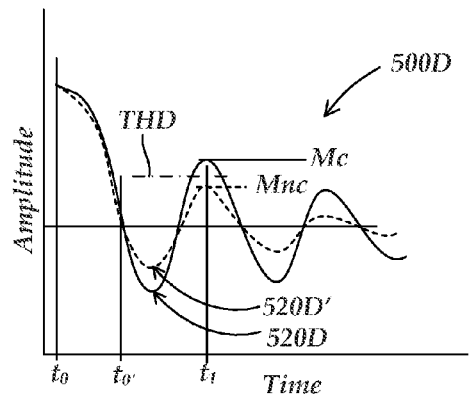

FIGS. 5C and 5D are graphs related to different aspects and/or methods of using a valid contact vibration signature criterion that depends on vibration damping effects that occur due to workpiece contact. As outlined previously, detection of increased damping of a vibration at at least one contact surface may be used to determine valid contact.

FIG. 5C is related to an embodiment wherein increased damping is detected as a decreased vibration amplitude or attenuated response to a driving frequency during a valid contact (e.g., in the case of a sufficiently sustained vibration provided by a vibration excitation element, or the like). Specifically, FIG. 5C is a graph 500C of a schematically represented vibration signature comprising certain vibration mode frequencies of an exemplary micrometer. Similar to FIG. 5B, the solid line shows a non-contact vibration signature and the dashed line shows a change associated with a contact vibration signature. The non-contact vibration signature shows first, second, and third frequency peaks 510C, 520C, and 530C, which may be analogous to the peaks 510B, 520B, and 530B' shown in FIG. 5B.

In various embodiments, vibration modes that maximize frictional energy dissipation between a contact surface and the workpiece provide the clearest vibration signature change due to increased damping. For example, as previously outlined, the third vibration peak 530C may not be the best choice for detecting vibration damping due to contact because as previously outlined it may be associated with a longitudinal vibration mode of the spindle, which need not cause significant "rubbing" or frictional energy dissipation between the spindle and a workpiece (e.g., the vibration direction may be parallel to the contact forces and/or normal to the contact surface). In contrast, the second vibration peak 520C may be associated with a lateral vibration mode of the spindle, wherein the vibration direction may be normal to the contact forces and/or parallel to the contact surface, which may cause a significant "rubbing" or frictional energy dissipation between the spindle contact surface and a workpiece. Thus, in the example shown in FIG. 5C, the second frequency peak amplitude 520C during the non-contact state is relatively high because, in the absence of workpiece contact, the associated vibration mode is not significantly damped and the vibration sensor (e.g., the vibration sensor 201 and/or 202 and/or 210) may sense a strong vibration (e.g., a resonant mode) driven by a vibration excitation element (e.g., the vibration excitation element 209 and/or 208 and/or 207).

The second frequency peak amplitude 520C' during a valid contact state (shown in dashed outline) is relatively low because in the presence of valid workpiece contact the associated vibration mode is significantly damped. A signal amplitude threshold THC may be established (e.g., by experiment and/or analysis) between the amplitudes 520C and 520C' to discriminate between a non-contact state and a valid contact state. Thus, in some embodiments, the valid contact vibration signature criterion may comprise the presence of a detected signal amplitude in the vibration signature that is lower than the signal amplitude present in the non-contact signature and/or lower than the amplitude threshold THC.

In some embodiments, a vibration excitation element may be located close enough to a vibration sensor to ensure its excitation in the absence of a workpiece, to provide a signal that has a high amplitude such that damping variations are more easily determined. In some embodiments, such an arrangement may be provided corresponding to each of the two contact surfaces or their related members (e.g., by the vibration excitation element 209 proximate to the vibration sensor 201, and by the vibration excitation element 208 proximate to the vibration sensor 210).

In some embodiments, the presence of a signal amplitude lower than the amplitude threshold THC may be detected by using a bandpass filter encompassing the frequency $f_2$ on the output of the appropriate vibration sensor, and determining the peak signal amplitude or the average rectified signal, or the like, and comparing it to an appropriate amplitude threshold THC using known circuits and/or routines. However, such embodiments are illustrative only, and not limiting. Alternative known amplitude detection circuits and/or routines may be used according to the principles disclosed herein.

FIG. 5D is related to an embodiment wherein increased damping is detected as a more rapid decay of a vibration amplitude resulting from a response to an impulse provided by a vibration excitation element, or the like. Specifically, FIG. 5D is a graph 500D of a schematically represented vibration signature comprising the vibration decay behavior of a particular vibration mode frequency of an exemplary micrometer. Similar to FIG. 5C, the solid line shows a non-contact vibration signature and the dashed line shows a change associated with a contact vibration signature. For reasons previously outlined with reference to FIG. 5C, in the example shown in FIG. 5D it may be desirable if the sensed vibration signal 520D (520D') corresponds to a lateral vibration mode of the spindle (and/or a lateral vibration mode of the anvil), wherein the vibration direction may be normal to the contact forces and/or parallel to the contact surface, which may cause a significant "rubbing" or frictional energy dissipation between the spindle contact surface and a workpiece.

As previously outlined, in various embodiments, a vibration sensor signal(s) may be sampled and held at a time (e.g., the time $t_1$ shown in FIG. 5D) that is based on a trigger derived from an initiation of the vibration excitation element pulse (e.g., at about the time $t_0$ shown in FIG. 5D), or derived from a vibration sensor signal initially crossing a trigger threshold value (e.g., at about the time $t_0'$ shown in FIG. 5D), or the like. The appropriate delay time between $t_0$ or $t_0'$ and the signal sample time $t_1$ (or rectified signal integration time termination), or the like, may be chosen based on experiment and/or analysis and controlled by known timing circuits or routines. Various alternative known signal decay or amplitude detection circuits and/or routines may be used according to the principles disclosed herein.

The signal amplitude Mnc at the time $t_1$ during the non-contact state is relatively high because in the absence of workpiece contact the associated vibration mode is not significantly damped and the vibration sensor (e.g., the vibration sensor 201 and/or 202 and/or 210) may sense a strong vibration driven by an impulse from a vibration excitation element (e.g., the vibration excitation element 209 and/or 208 and/or 207). The signal amplitude Mc at the time $t_1$ is relatively low during a valid contact state (shown in dashed outline) because in the presence of valid workpiece contact the associated vibration mode is significantly damped. A signal amplitude or decay threshold THD may be established (e.g., by experiment and/or analysis) between the amplitudes Mnc and Mc to discriminate between a non-contact state and a valid contact state. Thus, in some embodiments, the valid contact vibration signature criterion may comprise the presence of a larger detected decay rate and/or a lower detected signal amplitude in a decaying vibration signature than that present in a non-contact vibration signature and/or lower than the signal amplitude or decay threshold THD.

As previously indicated with reference to FIG. 5C, in some embodiments, a vibration excitation element may be located close enough to a vibration sensor to ensure its excitation in the absence of a workpiece, to provide a signal that has an initially high amplitude such that damping and/or decay rate variations are more easily determined. In some embodiments, such an arrangement may be provided corresponding to each of the two contact surfaces or their related members (e.g., by the vibration excitation element 209 proximate to the vibration sensor 201, and by the vibration excitation element 208 proximate to the vibration sensor 210).

Figure 6:
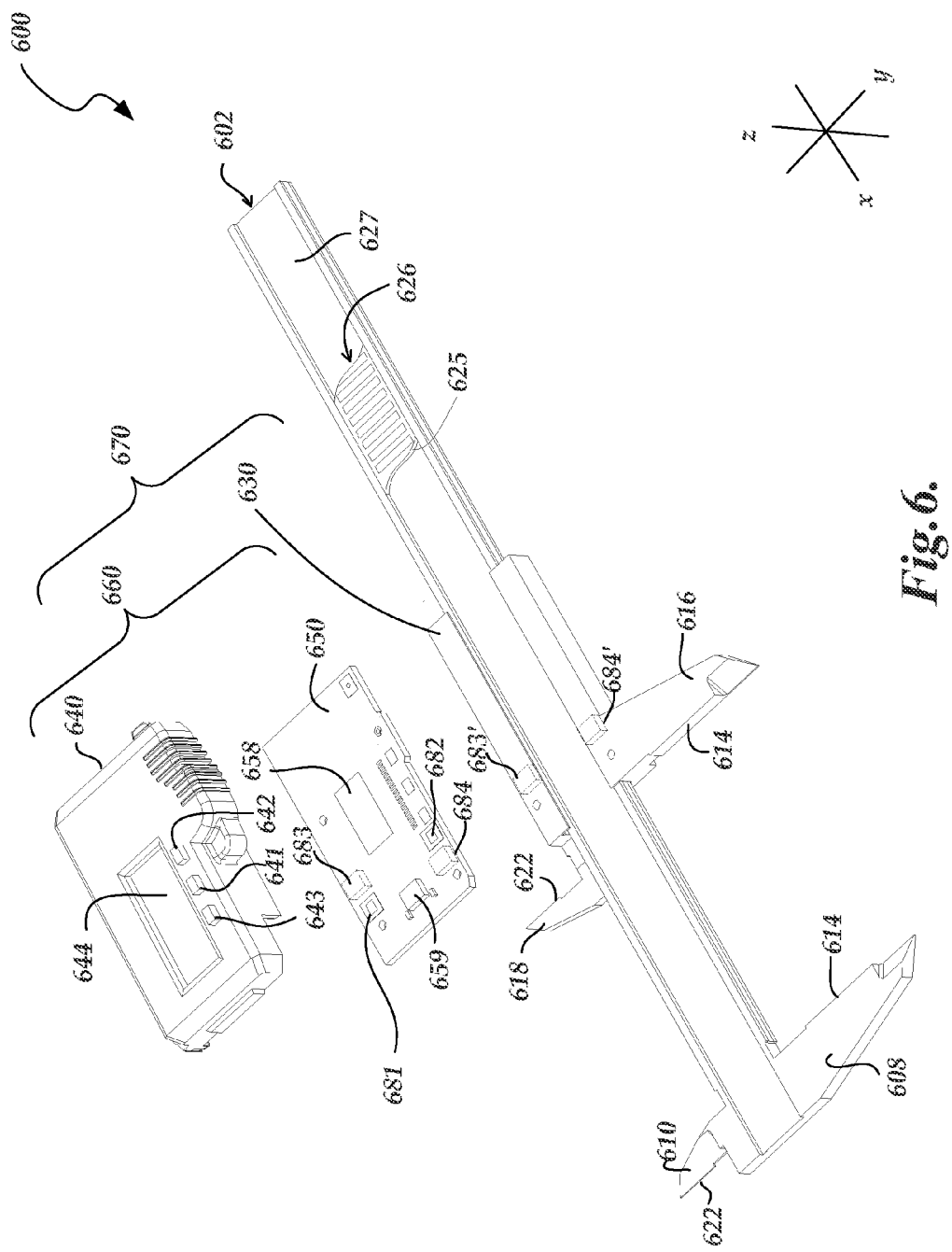
FIG. 6 is an exploded-view diagram of one embodiment of a hand tool type caliper that may be adapted to the principles disclosed herein to validate a workpiece measurement.

FIG. 6 is an exploded view diagram of one embodiment of a contact-type dimensional metrology hand tool that is a caliper 600 that may be adapted to the principles disclosed herein to validate a workpiece measurement. In this example, the caliper 600 comprises a magnetic or inductive sensor assembly 658 and a scale substrate 625 including a scale track 626 (a cut-away segment of each is illustrated) is positioned in a groove 627 along an elongated scale member 602. A slider assembly 670 includes an electronic assembly 660 attached to a slider 630. The magnetic or inductive sensor assembly 658 is included in the electronic assembly 660. The general mechanical structure and physical operation of the caliper 600 is similar to that of certain prior electronic calipers, such as that of commonly assigned U.S. Pat. No. 5,901, 458, which is hereby incorporated by reference in its entirety. The scale member 602 is a rigid or semi-rigid bar which may include various grooves and/or other features incorporated into a generally rectangular cross section. The scale substrate 625 may be rigidly bonded in the groove 627, and the scale track 626 may include scale elements that cooperate with corresponding elements (not shown) of the sensor assembly 658 included in the electronic assembly 660, in a manner similar to that used in known electronic calipers and as described in previously incorporated U.S. Pat. Nos. RE37490 and 5,901,458, and commonly assigned U.S. Pat. No. 6,400, 138, which is incorporated herein by reference in its entirety.

A pair of jaws 608 and 610 is integrally formed near a first end of the scale member 602. A corresponding pair of jaws 616 and 618 is formed on the slider 630. The outside dimensions of a workpiece are measured by placing the workpiece between a pair of engagement surfaces 614 of the jaws 608 and 616. Similarly, the inside dimensions of a workpiece are measured by placing a pair of engagement surfaces 622 of the jaws 610 and 618 against opposing internal surfaces of the workpiece. In a position sometimes referenced as the zero position, the engagement surfaces 614 abut one another, the engagement surfaces 622 are aligned, and both the outside and inside dimensions measured by the caliper 600 may be indicated as zero.

The measured dimension may be displayed on a digital display 644, which is mounted within a cover 640 of the electronic assembly 660 of the caliper 600. The electronic assembly 660 may also include a set of push button switches 643, 641, and 642 (e.g., an on/off switch, mode switch, and zero set switch), and a signal processing and display circuit board 650 comprising a readhead signal processing and control circuit 659. In one embodiment shown in FIG. 1, the bottom surface of the signal processing and display circuit board 750 is mounted to abut the top surfaces of the slider 630 on either side of the scale member 602.

It should be appreciated, that while a magnetic or inductive caliper is described above, an electronic caliper using any sensor type may be adapted to the principles described with reference to FIG. 1. For example, a caliper using capacitive sensing technology may utilize features described in FIG. 1.

As shown in FIG. 6, the caliper 600 further comprises one or more of a vibration sensor 681 and/or 682, or the like, and one or more of a vibration excitation element 683 or 683' and/or 684 or 684', or the like. In general, the practical locations and connections for vibration sensors and vibration excitation elements on a caliper more constrained than those on a micrometer. In particular, although placing vibrations sensors and vibration excitation elements proximate to contact surfaces 614 and 622 is possible, it is also problematic and/or expensive, in that the associated member is not generally directly connected to active electronic circuits or signal processing. Therefore, it is more difficult, but not impossible, to use the valid contact vibration signature criterion and techniques outlined above that transmit vibrations through the workpiece.

The valid contact vibration signature criterion and techniques outlined above with reference to FIGS. 5C and 5D, which rely on vibration damping effects, may be more practical embodiments in relation to a caliper application. Towards this end, in such embodiments, it may be desirable for the vibration excitation elements and/or the vibration sensors to be designed to excite and/or detect a lateral vibration mode (that is a mode that creates displacement of the jaws 616 and/or 618 along the direction of the YZ plane), for reasons previously outlined with reference to FIG. 5C, regarding a lateral vibration mode of the micrometer spindle. Because the valid contact vibration signature criterion may be more difficult and/or less reliable to implement in a caliper, using the measurement stability criterion outlined below in combination with the valid contact vibration signature criterion, as disclosed and claimed herein, may be particularly beneficial in a caliper application.

Figure 7A:
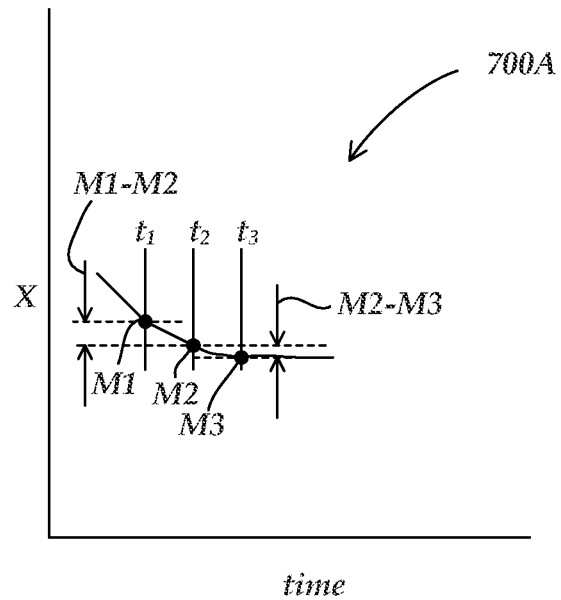
FIG. 7A is a schematic graph of a series of measurements along a dimension X sampled by a micrometer (e.g., the micrometer of FIG. 2) over time.

FIG. 7A is a schematic graph 700A of a set of dimensional measurements M1 to M3 of a micrometer (e.g., the micrometer gauge 1 of FIG. 2) over time. Identification of a valid seating state may be based on a measurement stability criterion applied to such a set of dimensional measurements, as described further below. In various conventional micrometers and other contact-type dimensional metrology hand tools, measurement samples occur at regular intervals such as every tenth of a second or so. The set of dimensional measurements M1 to M3 may comprise such sequential measurement samples, stored in a memory of the micrometer as they occur. Only three measurements are described in the set, for simplicity. Of course more measurements may be stored and processed according to similar principles. It may be understood that the sequentially decreasing values of the measurements M1 to M3 indicate that the micrometer spindle is closing toward the anvil, as required for a proper measurement in a micrometer.

One exemplary embodiment of a measurement stability criterion comprises a stable displacement measurement corresponding to a current displacement measurement that differs from a previous measurement by a difference value that is below a stability threshold amount. This will be the case, as the micrometer closes against a workpiece, which eventually becomes properly seated and restricts further closing. For example, a measurement M2 (taken at a time $t_2$) differs from a previous measurement M1 (taken at a time $t_1$) by a value that is greater than a stability threshold TH. A subsequent measurement M3 (taken at a time $t_3$) differs from the measurement M2 by a value that is less than the stability threshold TH. Therefore, the measurement M3 corresponds to a valid dimensional measurement in some embodiments.

The stability threshold may be made as small as the noise and resolution of the micrometer measurements allow, in various embodiments. In some embodiments, the minimum measurement and/or any current measurement within the stability threshold amount relative to the minimum measurement value in such a set of measurements may be indicated as fulfilling a measurement stability criterion. Of course, in the absence of fulfillment of a valid contact criterion (and assuming that one does not rely solely on user observation of workpiece contact, as in the prior art), it is not even inherently certain that a workpiece is present during the set of measurements outlined above. Thus, fulfilling a measurement stability criterion is a necessary, but not sufficient, condition for an accurate dimensional measurement.

When the measurement stability criterion is fulfilled simultaneously with the vibration signature valid contact criterion being fulfilled, sufficient conditions are present for an accurate dimensional measurement with a high probability. Therefore, in some embodiments, the set of dimensional measurements need not be stored and/or need not be analyzed, until such time as a vibration signature indicates that a valid contact criterion is fulfilled. This may concern signal processing time and/or power in various embodiments. In various embodiments, user judgment that a measurement is valid and accurate may be augmented or replaced by an automatic indication that both conditions are fulfilled in relation to a displayed or output dimensional measurement.

Figure 7B:
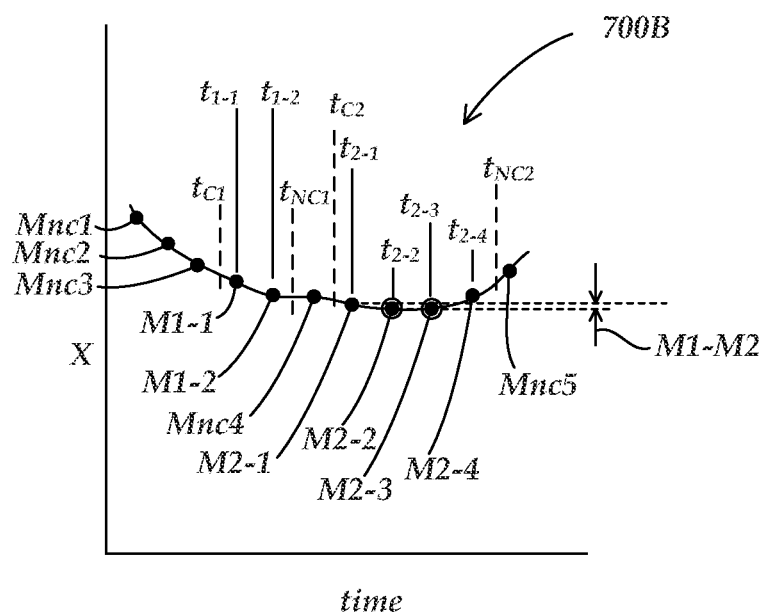
FIG. 7B is a schematic graph of a series of measurements along a dimension X sampled by a caliper (e.g., the caliper of FIG. 6) over time.

FIG. 7B is a schematic graph 700B of a series of dimensional measurements of a caliper (e.g., the caliper of FIG. 6) over time. Identification of a valid seating state may be based on a measurement stability criterion applied to such a set of dimensional measurements. In contrast to a micrometer, because its measurement contact surfaces are not rigidly constrained by a set of screw threads and because it may measure either external or internal dimensions, the caliper may include signal processing and/or routine that implements a slightly more complicated measurement stability criterion for identifying a valid seating state based on a set of dimensional measurements, as described further below.

The series of dimensional measurements shown in the graph 700B may comprise sequential measurement samples stored in a memory of the caliper as they occur. Only 11 measurements are described in the series, for simplicity. Of course more measurements may be stored and processed according to similar principles. In one embodiment, a first-in/first-out scheme may be used to retain a desired number of recent measurements for analysis while conserving memory. In the example shown in FIG. 7B, the sequentially decreasing values Mnc1 to Mnc3 may be stored prior to a valid contact state. Then, at a time $t_{C1}$ ongoing signal processing operations determine that the valid contact criterion is fulfilled according to previously outlined principles. Since this indicates that a workpiece is present and that a desired measurement is imminent, the caliper signal processing may be configured to determine whether an intent to perform an interior or exterior measurement is indicated, based on an increasing or decreasing trend in the most recent readings prior to the valid contact state. In this example, the most recent readings, the measurements Mnc1 to Mnc3 are decreasing, which means the caliper jaws are approaching one another to perform an exterior dimension measurement. As previously described in relation to a micrometer measurement, this implies that a minimum measurement corresponds to a valid seating state. The measurement stability criterion which indicates the valid seating state is then chosen accordingly, and is used to monitor and/or analyze the set of measurements M1-X acquired after the valid contact state is indicated at the time $t_{C1}$. In this example, one might suppose that because the set of measurements M1-1 and M1-2 continue to decrease significantly during the valid contact state, that the workpiece is not properly seated (e.g., it is in "twisted" contact with the caliper jaws, in a manner analogous to that illustrated in FIG. 3. Continuing with this supposition, at the time $t_{NC1}$, ongoing signal processing operations determine that the valid contact criterion is no longer fulfilled according to previously outlined principles. A subsequent reading Mnc4 is substantially unchanged from the previous "valid contact" measurement M1-2. One might suppose that the workpiece has rotated (e.g., a user has relaxed forces applied to the workpiece relative to those applied during the valid contact state) such that it fits between the caliper jaws without contact.

The user may then continue to adjust the workpiece and close the jaws, such that contact is established and at a time $t_{C2}$ ongoing signal processing operations determine that the valid contact criterion is again fulfilled. Since this again indicates that a workpiece is present and that a desired measurement is imminent, the caliper signal processing may be configured to again determine whether an intent to perform an interior or exterior measurement is indicated, based on an increasing or decreasing trend in the most recent readings prior to the current valid contact state. Again, the measurements Mnc1 to Mnc3, and/or M1-1 and M1-2, and/or Mnc4 are decreasing, which implies an exterior dimension measurement is in progress and a minimum measurement corresponds to a valid seating state. The measurement stability criterion is again chosen accordingly, and is used to monitor and/or analyze the set of measurements M2-X acquired after the second valid contact state in this example is indicated at the time $t_{C2}$. As shown in this example, the difference between the measurements M2-2 and M2-1 fulfills the measurement stability criterion (e.g., it is less than a stability threshold, and M2-1 in a current minimum reading) during the valid contact state such that the workpiece has apparently become properly seated, and measurement M2-2 is indicated as a valid measurement. The measurement M2-3 also fulfills the measurement stability criterion during the valid contact state, such that the measurement M2-3 is also indicated as a valid measurement.

In this example, the measurement M2-4 then indicates an increase in the separation of the caliper jaws, such that the measurement M2-4 has too large a positive difference from the previous minimum reading M2-3 (e.g., it is larger than the measurement stability threshold, and is not a minimum), and therefore fails to fulfill the current measurement stability criterion. Accordingly, the measurement M2-4 is not indicated as a valid measurement, even though it occurs during a valid contact state. One might suppose that this situation could occur because the user has applied an increased torque to the workpiece, or relaxed a force applied to close the caliper jaws, such that they open slightly while still contacting the workpiece which has again become improperly seated (e.g., it is again in "twisted" contact with the caliper jaws in a manner analogous to FIG. 3).

In this example, the separation of the caliper jaws then continues to increase, and at the time $t_{NC2}$, ongoing signal processing operations determine that the valid contact criterion is no longer fulfilled. The subsequent reading Mnc5 is not indicated to be a valid measurement. Monitoring for valid measurements may continue according to the principles outlined above and/or as described further below. It will be appreciated that if a valid contact state is identified, and the recent readings prior to the valid contact state indicate an increasing separation of the caliper jaws, that would imply that an interior dimension measurement is in progress and a maximum measurement corresponds to a valid seating state. The measurement stability criterion would be chosen accordingly, and used to monitor and/or analyze a subsequent set of measurements for a valid seating state.

In some embodiments, monitoring for ongoing valid measurements following an established valid measurement determination may comprise repeating the vibration excitation and vibration signature sensing operations according to a desired sample rate, along with confirming an ongoing valid contact state based on applying a vibration signature criterion to the vibration signatures thus obtained. Ongoing measurements obtained after an established valid measurement may be considered and/or indicated as valid until the end or absence of a valid contact state is identified, or the end or absence of a valid seating state is identified (e.g., as outlined above with reference to FIGS. 7A and 7B). Such an embodiment may be more practical in applications where the vibration excitation element is an electrically driven element and adequate power and/or battery life is available.

In other embodiments, monitoring for ongoing valid measurements following an established valid measurement determination may comprise temporarily ceasing verification of the valid contact state, and relying solely on determining the end or absence of a valid seating state. In other words, ongoing measurements obtained after an established valid measurement may be considered and/or indicated as valid until the end or absence of a valid seating state is identified (e.g., as outlined above with reference to FIGS. 7A and 7B). Such an embodiment may be more practical in applications where the vibration excitation element is directly or indirectly driven by a user's manual operation of the dimensional metrology tool. In such embodiments, it may be more natural to suspend vibration excitation operations when a workpiece is properly seated and in a stable position. In such a case, simply monitoring the stability of measurements (e.g., in comparison to an established valid measurement), and considering and/or indicating ongoing measurements as valid until the end or absence of a valid seating state is identified, may be sufficient. This may be the case because an established valid measurement corresponding to valid and stable seating of the workpiece will generally be a minimum (or maximum) measurement in a recent set of measurements. Any significant measurement increase (or decrease) relative to that established valid measurement may be assumed to "break valid contact" and/or correspond to invalid seating. This method of ending a valid measurement determination and/or indication may be particularly reliable if the measurement stability threshold used for identifying an end of the valid seating state is relatively small (e.g., within the specified accuracy of the tool, or less than three times, or two times, or one times an increment of a least significant digit in a measurement display of the dimensional metrology tool, or the like).

Figure 8:
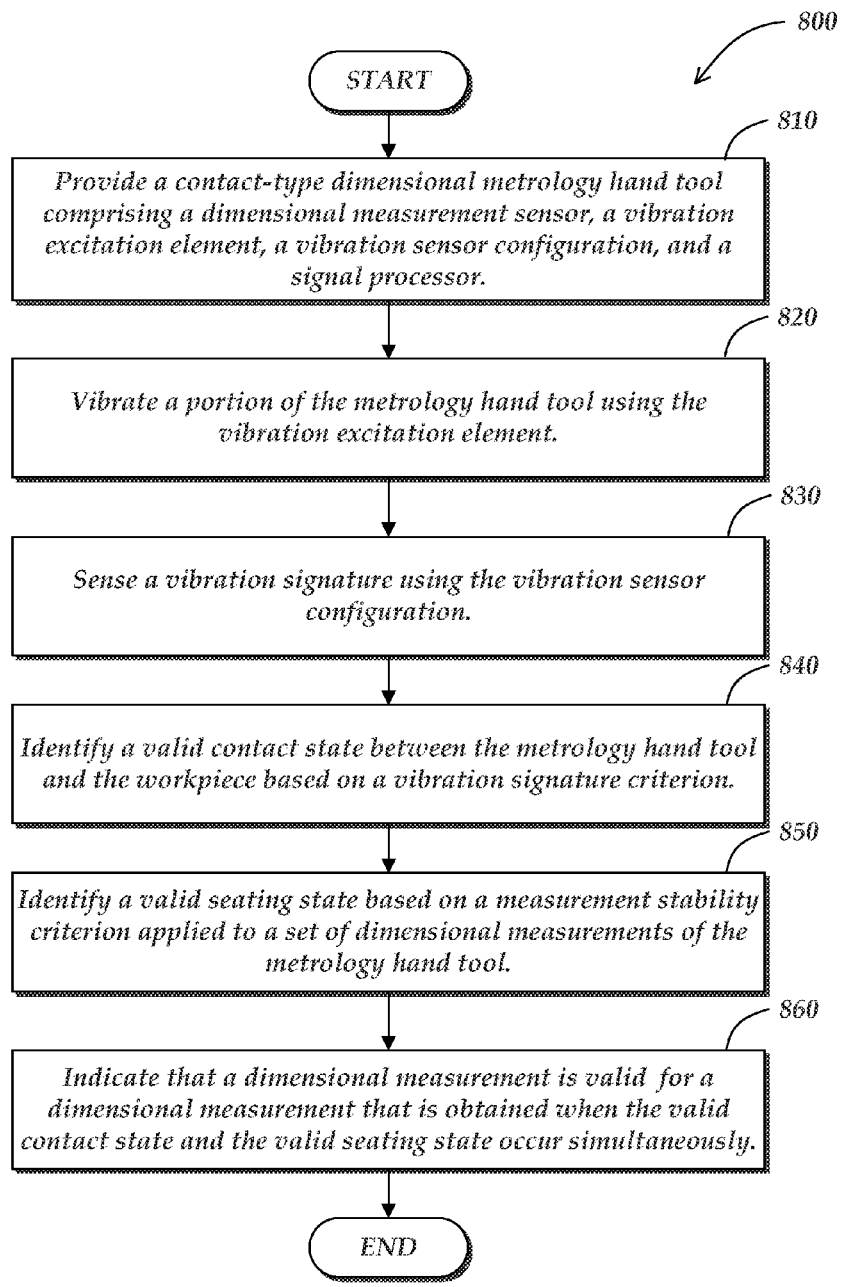
FIG. 8 is a flow diagram showing a method for validating a workpiece measurement in a dimensional metrology hand tool.

FIG. 8 is a flow diagram 800 showing a method for validating a workpiece measurement in a contact-type dimensional metrology hand tool. At block 810, a contact-type dimensional metrology hand tool is provided comprising a dimensional measurement sensor, a vibration excitation element, a vibration sensor configuration, and a signal processor. At block, 820, a portion of the metrology hand tool is vibrated using the vibration excitation element. At block 830, a vibration signature is sensed using the vibration sensor configuration. At block 840, a valid contact state is identified between the metrology hand tool and the workpiece based on a vibration signature criterion. At block 850, a valid seating state is identified based on a measurement stability criterion applied to a set of dimensional measurements of the metrology hand tool.

At block 860, it is indicated that a dimensional measurement is valid for a dimensional measurement that is obtained when the valid contact state and the valid seating state occur simultaneously. For example, one of the measurement validity indicators IND1, IND2, and IND3 shown in FIG. 1 may be activated. In some embodiments, indicating that a dimensional measurement is valid may comprise one of: turning on an indicator light, changing the color of an indicator light (e.g., from red to green), activating an icon on an LCD display, turning on a previously blank display, holding steady a previously blinking display, an audio signal, and automatically outputting an SPC signal.

Numerous variations in the illustrated and described arrangements of features and sequences of operations will be apparent to one skilled in the art based on this disclosure. Thus, it will be appreciated that various changes can be made therein without departing from the spirit and scope of the claimed subject matter.

The embodiments of the invention in which an exclusive property or privilege is claimed are defined as follows:

1. A method for validating a workpiece measurement in a dimensional metrology hand tool, the
   dimensional metrology hand tool comprising a first workpiece contact surface included on a first member and a second workpiece contact surface included on a second member that moves relative to the first member, a dimensional measurement sensor for measuring a separation between the first and second contact surfaces, and a signal processor, the method comprising:
   vibrating a portion of the metrology hand tool using a vibration excitation element of the metrology hand tool;
   sensing a vibration signature using a vibration sensor configuration of the metrology hand tool;
   identifying a valid contact state between the metrology hand tool and the workpiece based on a vibration signature criterion applied to the vibration signature;
   identifying a valid seating state of the workpiece as seated against the first and second contact surfaces based on a measurement stability criterion applied to a set of dimensional measurements of the metrology hand tool; and
   indicating that a dimensional measurement is valid for a dimensional measurement that is obtained when the valid contact state and the valid seating state occur simultaneously.

2. The method of claim 1, wherein the dimensional metrology hand tool further comprises a visible measurement validity indicator, and the method comprises activating a display of the visible measurement validity indicator corresponding to a dimensional measurement that is obtained when the valid contact state and the valid seating state occur simultaneously.

3. The method of claim 2, wherein the method comprises operating the signal processor to perform the operations of identifying the valid contact state, identifying the valid seating state, and determining when the valid contact state and the valid seating state occur simultaneously, and to perform the operation of activating the display of the visible measurement validity indicator.

4. The method of claim 3, wherein the method further comprises:
   identifying an end of the valid seating state based on a measurement stability criterion applied to dimensional measurements of the metrology hand tool obtained after the operation of activating the display of the visible measurement validity indicator; and
   continuing the display of the visible measurement validity indicator for dimensional measurements obtained after the operation of activating display of the visible measurement validity indicator until the end of the valid seating state is identified, and then ending the display of the visible measurement validity indicator.

5. The method of claim 4, wherein the method further comprises:
   repeating the vibrating operation and the sensing a vibration signature operation, and identifying an end of the valid contact state based on the vibration signature criterion applied to a vibration signature obtained after the operation of activating the display of the visible measurement validity indicator; and
   continuing the display of the visible measurement validity indicator for dimensional measurements obtained after the operation of activating display of the visible measurement validity indicator until the end of the valid seating state is identified or the end of the valid contact state is identified, and then ending the display of the visible measurement validity indicator.

6. The method of claim 1, wherein:
   the vibration signature criterion corresponding to a valid contact state comprises at least one of:
   (a) a frequency present in a vibration signature during contact between the metrology hand tool and the workpiece, but not present when there is not contact between the metrology hand tool and the workpiece;
   (b) for at least one frequency in a vibration signature, the presence of a lower amplitude of a vibration signal that is present at a higher amplitude when there is not contact between the metrology hand tool and the workpiece;
   (c) for at least one frequency in a vibration signature, the presence of a higher amplitude of a vibration signal that is present at a lower amplitude when there is not contact between the metrology hand tool and the workpiece; or
   (d) for at least one frequency in a vibration signature, an indication of the presence of increased damping of a vibration signal that is present with less damping when there is not contact between the metrology hand tool and the workpiece, and
   identifying a valid contact state comprises determining the presence of at least one of (a), (b), (c), or (d) in the vibration signature using at least one of the signal processor of the hand tool or an external signal processor.

7. The method of claim 6, wherein identifying a valid contact state comprises determining the presence of at least one of (a) or (b).

8. The method of claim 7, wherein the at least one sensor is mounted proximate to a compliant element configured such that it has a resonant frequency that is responsive to contact between the metrology hand tool and the workpiece.

9. The method of claim 6, wherein identifying a valid contact state comprises determining the presence of (c).

10. The method of claim 9, wherein the vibration excitation element is mounted on the first member and at least one sensor of the vibration sensor configuration is mounted on the second member.

11. The method of claim 6, wherein identifying a valid contact state comprises determining the presence of (d).

12. The method of claim 11, wherein the vibration excitation element and at least a first sensor of the vibration sensor configuration are mounted on the same one of the first and second members.

13. The method of claim 1, wherein the measurement stability criterion comprises a current dimensional measurement differing from a previous dimensional measurement by a difference which is within a stability threshold amount.

14. The method of claim 13, wherein the stability threshold amount is at most three times an increment of a least significant digit of a digital measurement display of the dimensional metrology hand tool.

15. The method of claim 1, wherein the vibration excitation element comprises one of an electrically driven element or an element driven through a mechanism deriving power from a manual operation that is an inherent part of operating the metrology hand tool to contact the workpiece.

16. The method of claim 1, wherein the vibration excitation element provides a momentary impulse that excites a vibration.

17. The method of claim 1, wherein the vibration signature is a frequency-sampled vibration signature comprising at least one respective signal corresponding to a respective vibration frequency range.

18. The method of claim 1, wherein the dimensional metrology hand tool is one of a caliper or a micrometer.

19. A dimensional metrology hand tool for obtaining a dimensional measurement of a workpiece, the metrology hand tool comprising:
- a first workpiece contact surface included on a first member and a second workpiece contact surface included on a second member that moves relative to the first member;
- a dimensional measurement sensor for measuring a separation between the first and second contact surfaces;
- a vibration excitation element;
- a vibration sensor configuration;
- a visible measurement validity indicator; and
- a signal processor, wherein:
- the vibration excitation element is configured to vibrate a portion of the metrology hand tool;
- the vibration sensor configuration is configured to sense a vibration signature when the portion of the metrology hand tool is vibrated; and
- the signal processor is configured to:
  - identify a valid contact state between the metrology hand tool and the workpiece based on a vibration signature criterion applied to the vibration signature;
  - identify a valid seating state of the workpiece as seated against the first and second contact surfaces based on a measurement stability criterion applied to a set of dimensional measurements of the metrology hand tool;
  - determine when the valid contact state and the valid seating state occur simultaneously; and
  - activate a display of the visible measurement validity indicator indicating that a dimensional measurement is valid for a dimensional measurement that is obtained when the valid contact state and the valid seating state occur simultaneously.

20. A dimensional metrology hand tool comprising:
- a first workpiece contact surface included on a first member and a second workpiece contact surface included on a second member that moves relative to the first member;
- a dimensional measurement sensor for measuring a separation between the first and second contact surfaces;
- a vibration excitation element that is configured to vibrate a first portion of the metrology hand tool;
- a vibration sensor configuration that is configured to sense a vibration signature when the first portion of the metrology hand tool is vibrated;
- a visible measurement validity indicator; and
- a processor that is configured to execute one or more routines, wherein the one or more routines when executed by the processor cause the processor to at least:
  - determine a valid contact state between the metrology hand tool and the workpiece based on a vibration signature criterion applied to the vibration signature;
  - determine a valid seating state of the workpiece as seated against the first and second contact surfaces based on a measurement stability criterion applied to a set of dimensional measurements of the metrology hand tool; and
  - activate a display of the visible measurement validity indicator indicating that a dimensional measurement is valid for a dimensional measurement that is obtained when the valid contact state and the valid seating state occur simultaneously.

* * * * *